United States Patent
Estes

(10) Patent No.: US 8,214,453 B2
(45) Date of Patent: Jul. 3, 2012

(54) CONCEPT AND ASSOCIATED DEVICE ENABLING MULTI-CAMERA VIDEO AND AUDIO RECORDING FOR SYNCHRONIZATION WITH LONG TERM AMBULATORY ELECTROENCEPHALOGRAPHY (EEG) IN THE HOME, OFFICE, OR HOSPITAL ENVIRONMENT

(76) Inventor: Steven Charles Estes, Highland Village, TX (US)

( * ) Notice: Subject to any disclaimer, the term of this patent is extended or adjusted under 35 U.S.C. 154(b) by 1147 days.

(21) Appl. No.: 12/048,209

(22) Filed: Mar. 13, 2008

(65) Prior Publication Data

US 2008/0226255 A1   Sep. 18, 2008

Related U.S. Application Data

(60) Provisional application No. 60/894,838, filed on Mar. 14, 2007.

(51) Int. Cl.
G06F 15/16 (2006.01)
(52) U.S. Cl. .......................... 709/217; 709/230; 709/246
(58) Field of Classification Search .................. None
See application file for complete search history.

(56) References Cited

U.S. PATENT DOCUMENTS

| | | | | |
|---|---|---|---|---|
| 5,222,503 A * | 6/1993 | Ives et al. | ....................... | 600/544 |
| 5,349,962 A * | 9/1994 | Lockard et al. | ............... | 600/545 |
| 5,813,993 A * | 9/1998 | Kaplan et al. | ................. | 600/544 |
| 6,011,579 A * | 1/2000 | Newlin | ....................... | 348/14.08 |
| 6,155,974 A * | 12/2000 | Fish | .............................. | 600/300 |
| 6,230,049 B1 * | 5/2001 | Fischell et al. | ................ | 600/544 |
| 6,549,804 B1 * | 4/2003 | Osorio et al. | ................. | 600/544 |
| 7,159,778 B1 * | 1/2007 | Kochevar et al. | ........ | 235/462.01 |
| 7,199,706 B2 * | 4/2007 | Dawson et al. | ................ | 340/538 |
| 7,430,608 B2 * | 9/2008 | Noonan et al. | ............... | 709/230 |
| 7,453,897 B2 * | 11/2008 | Enbom et al. | ................. | 370/412 |
| 7,502,498 B2 * | 3/2009 | Wen et al. | ..................... | 382/128 |
| 7,630,757 B2 * | 12/2009 | Dorfmeister et al. | ......... | 600/544 |
| 7,676,263 B2 * | 3/2010 | Harris et al. | ................. | 600/544 |
| 7,698,723 B2 * | 4/2010 | Hicks et al. | ..................... | 725/82 |
| 7,733,224 B2 * | 6/2010 | Tran | ............................. | 340/540 |
| 8,028,097 B2 * | 9/2011 | Iwamura | ....................... | 709/248 |
| 2002/0057340 A1 * | 5/2002 | Fernandez et al. | ............ | 348/143 |
| 2003/0023741 A1 * | 1/2003 | Tomassetti et al. | ........... | 709/231 |
| 2004/0006484 A1 * | 1/2004 | Manis et al. | ................... | 704/500 |
| 2004/0025030 A1 * | 2/2004 | Corbett-Clark et al. | ...... | 713/186 |
| 2004/0163130 A1 * | 8/2004 | Gray et al. | ..................... | 725/132 |
| 2004/0250273 A1 * | 12/2004 | Swix et al. | ....................... | 725/25 |
| 2005/0018766 A1 * | 1/2005 | Iwamura | .................. | 375/240.01 |
| 2005/0107716 A1 * | 5/2005 | Eaton et al. | .................... | 600/544 |
| 2005/0165323 A1 * | 7/2005 | Montgomery et al. | ....... | 600/544 |
| 2005/0177400 A1 * | 8/2005 | Rosenfeld et al. | ................ | 705/3 |
| 2006/0233203 A1 * | 10/2006 | Iwamura | ....................... | 370/516 |
| 2007/0274532 A1 * | 11/2007 | Adachi et al. | ................... | 381/77 |
| 2007/0282208 A1 * | 12/2007 | Jacobs et al. | .................. | 600/485 |

* cited by examiner

Primary Examiner — Thu Nguyen
Assistant Examiner — Angela Widhalm
(74) Attorney, Agent, or Firm — Mark W Handley

(57) ABSTRACT

The concept and associated device enabling multi-camera video & audio recording for synchronization with long term ambulatory electroencephalography allows for multiple cameras and microphones to be used in a home setting monitoring from various locations in the home for long term ambulatory EEG monitoring. No longer is Video EEG monitoring with multiple cameras and microphones limited to a cabled hospital type setting. This device could also be utilized by hospitals to conduct video monitoring from any hospital type room.

8 Claims, 3 Drawing Sheets

Figure 1:
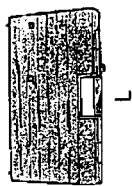
Figure 1:
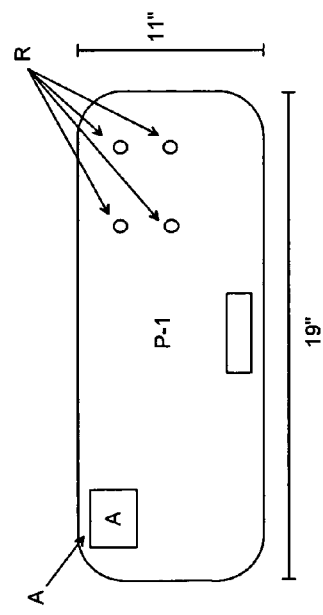

CONCEPT AND ASSOCIATED DEVICE ENABLING MULTI-CAMERA VIDEO AND AUDIO RECORDING FOR SYNCHRONIZATION WITH LONG TERM AMBULATORY ELECTROENCEPHALOGRAPHY (EEG) IN THE HOME, OFFICE, OR HOSPITAL ENVIRONMENT

PREVIOUS FILING

This application emanates from a previously filed application No. 60/894,838 filed on Mar. 14, 2007

FIELD OF THE INVENTION

The present invention relates to a device enabling multi-camera video & audio recording for synchronization with long term ambulatory electroencephalography (EEG).

BACKGROUND OF THE INVENTION

This invention, also referred to as video link, allows for multiple cameras and microphones to be used in a home setting monitoring from various locations in the home for long term ambulatory EEG monitoring. No longer is Video EEG monitoring with multiple cameras and microphones limited to a cabled hospital type setting. This device could also be utilized by hospitals to conduct video monitoring from any hospital type room.

SUMMARY OF THE INVENTION

The invention is titled the Video-Link because it takes video and audio from a camera with microphone in the bedroom area, and through a home network via wall-plugged Ethernet adapters or wireless router multiple IP fed video/audio inputs and mixes them for input to the EEG instrument through the USB port.

This device is comprised of the following components:
(1) Cameras with built-in audio microphones placed in the bedroom and living room area
(2) Video-Link kit is comprised of a plastic case containing: wireless router, network decoder, video/audio mixer, Video Grabber, USB powered fan, power center, and various cables. Each piece is programmed accordingly for interfacing with each other.
(3) Camera feed from bedroom camera is input
(4) Ethernet patch cable from Video-Link goes to wall plugged Ethernet adapter in bedroom
(5) Ethernet patch cable from Living room camera with built-in microphone goes to wall plugged Ethernet adapter in the living room
(6) USB cables from Video Link kit plug into the computer laptop from the EEG equipment manufacturer
(7) Video can now be seen on the laptop computer via the manufacturer's software package
(8) The actual construction of the device requires the following:
 1. Drilling mounting holes in the plastic case for cooling fan, power center, input/output interface cables, and security tags.
 2. Power center is then mounted to the inside lid of the plastic case
 3. Cooling fan is then mounted to the inside lid of the plastic case
 4. The Network decoder is mounted to the bottom of the plastic case
 5. The video mixer is mounted on top of the network decoder
 6. The network router is mounted on top of the video mixer
 7. The USB Video Grabber is mounted in the small compartment just to the right of the handle on the bottom half of the case
 8. Power supplies are connected from each component to the power center
 9. Interface cables are connected between each of the components, including y-audio cable for dual audio input from the camera/microphone sources.
 10. Each of the components are then sequentially programmed with the IP settings, video/audio layout settings, and configured to recognize each other. Data from the secondary camera is converted from digital to analog signal by the network decoder, and then mixed with the analog signals from the bedroom (primary) camera, then both signals are digitized by the USB Grabber component before being sent to the computer via USB port.
 11. The system is then tested with the commercially available EEG recording device and interfaced via the computer USB port
 12. Once the device has been shown to be reliable over a 24 hour recording period, the box is closed, serialized security hoops are installed near the hinges on the back of the plastic case, and around the handle. Also, a lock and serialized security hatch is used as well.
(9) The actual use of the device consists of the following steps:
 13. Position the Video link kit in the patient's bedroom, or main room where patient will be residing
 14. Plug the main power cord to the grounded wall outlet
 15. Plug in the wall plugged Ethernet adapter to the same or outlet nearby
 16. Plug in both of the USB style connectors into the computer
 17. Plug in the ⅛" audio plug adapter into the microphone input on the computer
 18. Plug in the Ethernet cable from the wall plugged Ethernet adapter into the Ethernet receptacle on the Video link device
 19. Plug in the video and audio BNC cables to the camera in the bedroom
 20. Plug the secondary living area IP camera into the wall outlet
 21. Plug in the secondary wall plugged Ethernet adapter into the wall outlet
 22. Plug in the Ethernet cable from the secondary wall plugged Ethernet adapter into the receptacle near the IP camera
 23. If the power is unplugged for any reason, or if power is lost, as soon as power is restored the Video link kit will automatically mix and provide the video and audio signal to the commercially available EEG recording device without any user intervention.

The invention is used with commercially available EEG recording devices to record video synchronized to the EEG tracing. The device can interface with various cameras and microphones besides the ones specifically used.

The Video-Link can also be used in the hospital setting to perform long-term monitoring of patients with Epilepsy or ICU patients who might be experiencing sub-clinical seizures, or various other disorders that may require monitoring.

BRIEF DESCRIPTION

Figure 2:
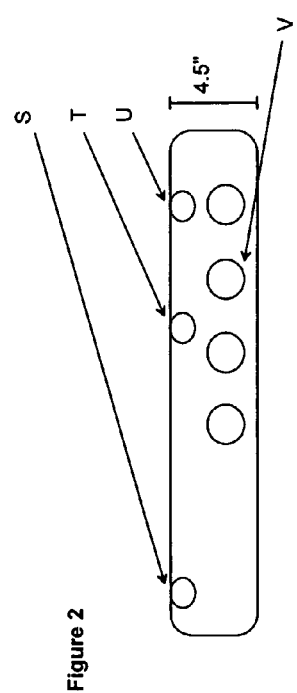
Figure 3:
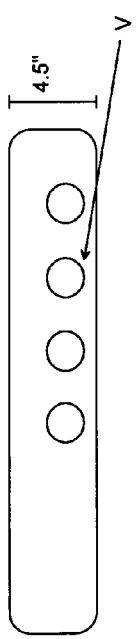
Figure 4:
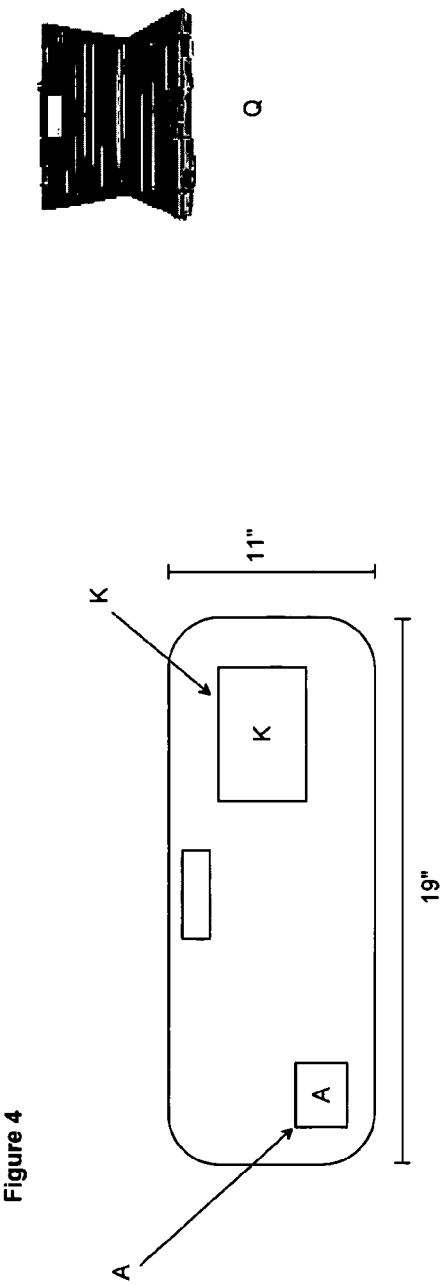
Figure 5:
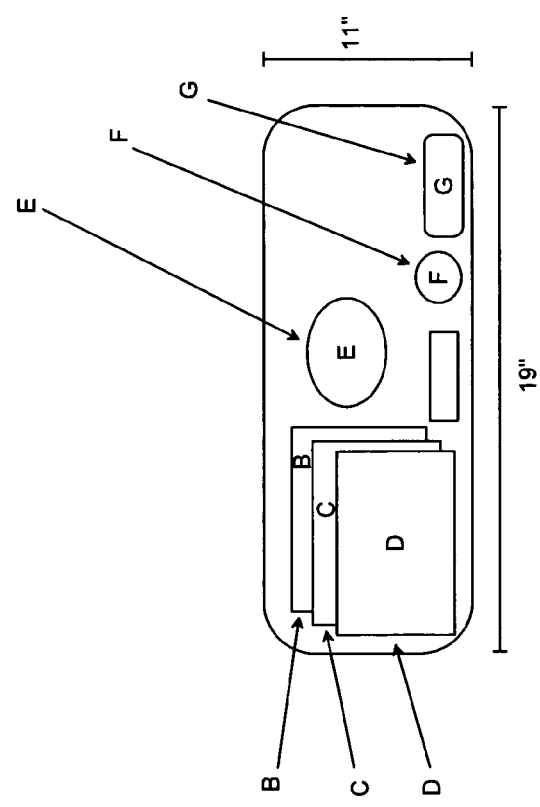
Figure 6:
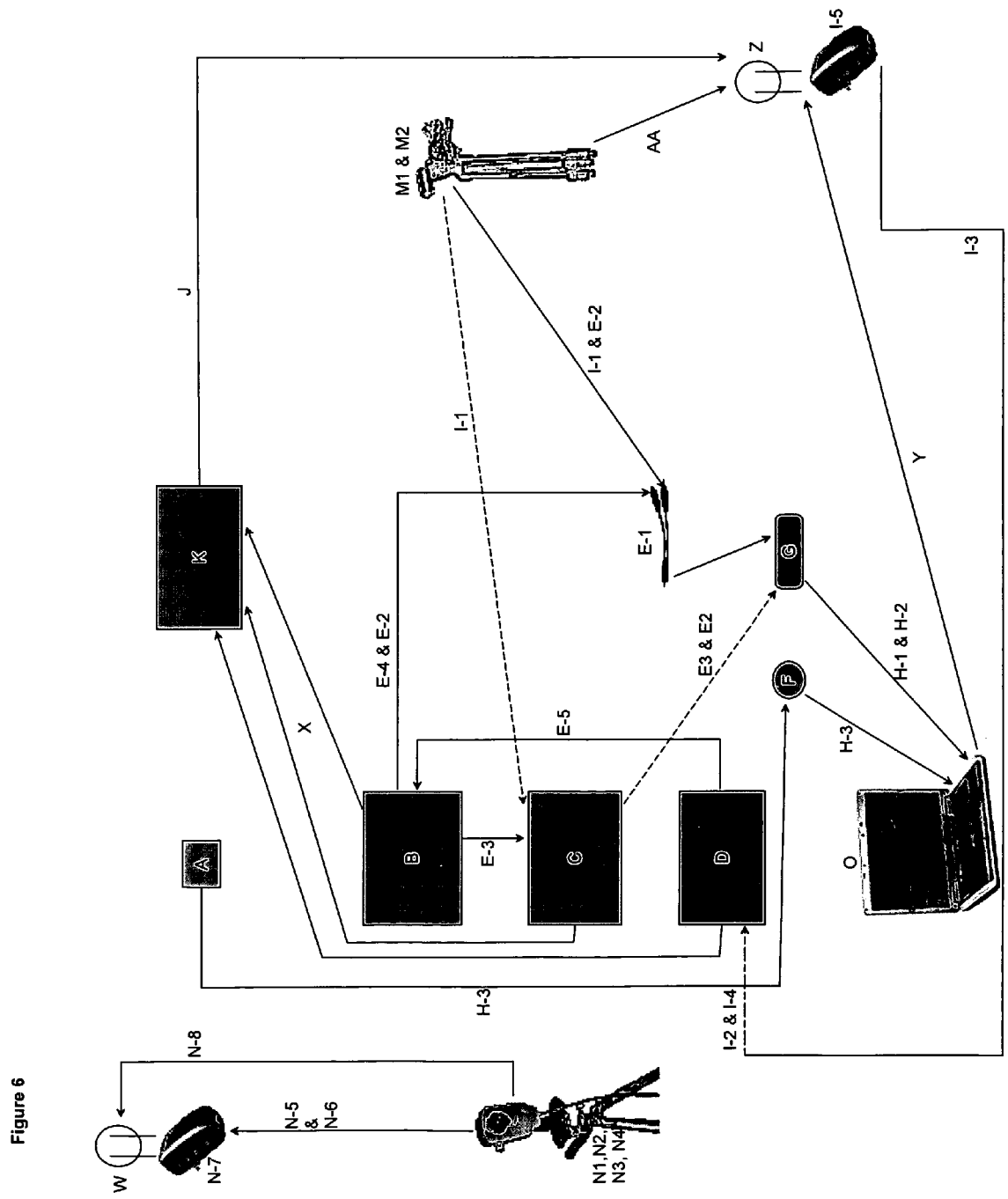

FIG. 1—Top of Video link
FIG. 2—Right side of Video link
FIG. 3—Left side of Video link
FIG. 4—Inside Lid of Video link
FIG. 5—Inside Bottom Main Area of Video link
FIG. 6—Video link Wiring Diagram and Utilization

DETAILED DESCRIPTION

All of the equipment is setup in the two areas intended for recording, which is generally the patient's home. The Living Room Recording Unit (N) is setup in the patient's living room area or other place that they may choose where they spend the majority of their time. The Bedroom Recording Unit (I) is setup in the patient's bedroom and is positioned to capture the patient's full body within view of the camera while sleeping.

The Video link enclosure (P-1) is placed in the bedroom, generally near the foot of the patient's bed, and the EEG Laptop (not part of the Video link Kit) is placed on top of the Video link Kit. Please, refer to FIG. 6 and the Video link Legend, as the complete functioning of the Video link Kit is described. The Bedroom Camera Setup consists of a camera with built-in infrared illumination, audio, and is encased in a sturdy waterproof enclosure (M-1). M-1 is mounted on the tripod (M-2) that is positioned in the bedroom.

The Bedroom Camera Setup (M-1) is hardwired from the factory with three cables exiting the back end of the body of the camera unit: Video Out with a BNC male connector (yellow), Audio Out with a BNC male connector (white), and a power adapter. The power adapter is plugged into the electrical outlet in the bedroom (W). The Video Out BNC male connector (yellow) is connected to the BNC female end of Part I-1. The other end of Part I-1 is plugged directly into the 4 Channel Color Quad Mixer (Part C). The Audio Out with a BNC male connector (white) is connected to the BNC female end of second Part I-1. The other end of the second Part I-1 is plugged into Part E-2 which converts the BNC male end into a male phone plug. Part E-2 is now plugged into Part E-1. The wall-plugged Ethernet adapter (Part I-5) is plugged into the Bedroom electrical outlet (W), and a 15 ft Ethernet cable (Part I-3) is plugged into Part I-5 at its Ethernet port receptacle. The other end of Part I-3 is plugged into Part I-4 which is an Ethernet Coupler. The other end of the Coupler (Part I-4) is plugged into Part I-2 which leads into the Video link Kit Enclosure (Part P-1). The 3 ft Ethernet Cable (Part I-2) that leads into the Video link Kit Enclosure (Part P-1) is plugged directly into the Network Router (Part D). This allows for the Living Room Recording Setup to communicate with the Video link Kit via the power line wiring resident in the patient's home. The EEG Laptop (Part O) power cord is plugged into the Bedroom electrical outlet (Z) which requires a surge protected power strip if one is not already in the home. The EEG Laptop (O) is then connected to Part H-1 which is the USB interface cable hardwired to Part G inside the Video link Kit Enclosure (Part P-1). The EEG Laptop (O) is then connected to Part H-2 which is the Audio Output cable that is hardwired to Part G inside the Video link Kit Enclosure (Part P-1). Part G translates the mixed analog video signals acquired from the Living Room and Bedroom Recording Units into digital video that can read by the EEG Laptop (Part O) via the USB port resident on the EEG Laptop (Part O). Part G also translates the mixed analog audio signals acquired from the Living Room and Bedroom Recording Units into digital audio than be read by the EEG Laptop (Part O) via the microphone input resident on the EEG Laptop (Part O). The EEG Laptop (Part O) is then connected to Part H-3 via another resident USB port on the EEG Laptop (Part O).

This connection provides the power that drives the fan (Part A) mounted inside the Video link Kit to provide constant air flow through the Video link Kit Enclosure (Part P-1). Please, refer to FIG. 1 to locate the Cooling Fan Exhaust Port for Part A. Please, refer to FIGS. 2 and 3 to locate the ventilation holes (V) on both the right and left sides of the Video link Kit Enclosure (Part P-1). Part H-3 is anchored inside the enclosure (Part P-1) to the right of the handle where Part F resides. Part F is power supply for the cooling fan (Part A) which is then connected to the cooling fan (Part F) by the secondary strand of Part H-3. The Living Room recording setup consists of a mini-tripod (Part N-1), Network Wireless Camera (Part N-2), three bolts, nuts, washers, and lock washers (Part N-3) used to secure the camera to the mini-tripod (Part N-1), an Ethernet Patch cable 1 foot in length (Part N-4) and an Ethernet Coupler (Part N-6). The Network Wireless Camera (Part N-2) is connected to the Living Room electrical outlet via the camera power supply cable (N-8). Part N-4 is attached to the Ethernet port receptacle on the Network Wireless Camera (Part N-2). The other end of the Ethernet Patch cable (Part N-4) is connected to the Ethernet Coupler (Part N-6). Part N-6 is then connected to Part N-5 which is a 15 foot Ethernet patch cable. The other end of Part N-5 is connected to the Ethernet port receptacle on the Wall-plugged Ethernet Adapter (Part N-7). Part N-7 is then plugged directly into the Living Room electrical outlet (W). This process allows the Living Room recording equipment to communicate across the power line wiring resident in the patient's home so that a connection can be made to the Network Router (Part D) resident inside the Video link Kit enclosure (Part P-1). All Video and Audio digitized data is sent from Part N-2 to the Network Router (Part D). The Network Router (Part D) then transfers the signals to the Network Video Decoder (Part B) which translates the digital Video and Audio signals into analog signals for output. The newly translated video output from the Network Video Decoder (Part B) is transmitted to the 4 Channel Color Quad Mixer (Part C) via a BNC male to BNC male 1 foot long cable between the two devices (Part B and Part C). The newly translated audio output from the Network Video Decoder (Part B) is transmitted by way of Part E-4 that is plugged directly into the Network Video Decoder (Part B). At the other end of Part E-4 a BNC female jack to phono plug adapter (Part E-2) is used to convert the connector so it will plug into the Y-audio cable (Part E-1). The audio signal is merged together with the analog audio signal from the Bedroom camera via Part E-1. The male end of Part E-1 is plugged into the female RCA input (white) that is hard-wired to Part G. Part E-3 is fitted with the adapter (Part E-2). The end of Part E-3 without the adapter is a male BNC plug which is plugged into the video output on the 4 Channel Color Quad Mixer (Part C), and the other end that has been fitted with Part E-2 is connected to the female RCA video input (yellow) cable on Part G. Now that both video signals and audio signals from both recording units have been mixed and brought into Part G, they are re-digitized and fed into the EEG Laptop (Part O) for presentation on the screen and synchronized with the EEG data (brainwaves) for review by the physician. Inside the Video link Kit enclosure (Part P-1) there are power cables (X) running from each of the components requiring power (Part B, C, & D) into Part K which is the central power source inside the enclosure (Part P-1). Part K is connected to the Bedroom Electrical (Z) outlet via Part J which is the sole power cable that exits the enclosure on the right side of the kit. Also, inside the Video link Kit enclosure (Part P-1) are several zip ties to secure the cabling, two cable clamps to provide for strain relief, and Velcro to secure the various components. Velcro straps are wrapped around Part K to provide secured latching for the power cables plugged in there. Also, on the outside of the Video Link Kit on the right side of the handle there is a place for a small padlock to be used to keep the unit securely fastened. Two latches on either side of the handle are also used to keep the enclosure from opening while in use.

Device Legend
Part
ID Description
A External USB Cooling Fan
B Network Video Decoder
C 4 Channel Color Quad Mixer
D Network Router
E-1 Y-Audio cable, 1 RCA Male to 2 RCA Female
E-2 BNC Female Jack to Phono plug adapter
E-3 BNC Male to BNC Male 1 ft.
E-4 3.5 mm or ⅛" audio male to RCA Male
E-5 Ethernet patch cable—1 ft.
F USB Fan Power Supply
G High Speed USB Video Grabber
H-1 USB Interface cable from Part G
H-2 Audio Output from Part G
H-3 Fan power cord from Part A
I-1 BNC Male (twist lock) to BNC Male 12 ft.
I-2 Ethernet patch cable—3 ft.
I-3 Ethernet patch cable—15 ft.
I-4 Ethernet CAT5 coupler
I-5 Wall plugged ethernet bridge
J Power cord from Part K
K 8-outlet Power Center w/Cord
L Exterior view of complete Video Link Enclosure
M-1 ⅓" CLR weatherproof IR camera with Video and Audio
M-2 Tripod
N-1 Mini-Tripod
N-2 Network Camera Wireless
N-3 Bolts & Nuts (#8—32×½), Washers #8, Lock Washers #8
N-4 Ethernet patch cable—1 ft.
N-5 Ethernet patch cable—15 ft.
N-6 Ethernet CAT5 coupler
N-7 Wall plugged ethernet bridge
N-8 Power cable from Part N-2
O Laptop from EEG equipment (shown for demonstration purposes, not included in Video link Kit)
P-1 Exterior view of Video link Enclosure
P-2 Screws (#6×1); Washers #6, Lock Washers #6
Q Interior view of Video link Enclosure
R Holes drilled for mounting K with P-2
S Exit Holes for Parts H-1, H-2, H-3
T Exit Hole for Part J
U Exit Holes for Parts I-1 (Qty.2), I-2
V Ventilation Holes
W Living Room Power Outlet
X Power Cords from Parts B,C,D
Y Power cord from Part O
Z Bedroom Power Outlet
AA Power cord from Part M-1
Misc Zip ties
Misc Cable clamp (small)
Misc Velcro 4'×2Δ Black Industrial Strength Velcro & Velcro Straps
Misc Padlock 1" Brass Luggage

What is claimed is:

1. A device for enabling multi-camera video and audio recording for synchronization with long term ambulatory electroencephalography comprising:
a first video camera which records local audio and local video in the local space when a subject is disposed in the local space, said first video camera having an analog audio output and an analog video output providing local analog audio signals and local analog video signals, respectively;
a second video camera which records remote audio and video in the remote space when the subject is disposed in the remote space, said second video camera having a digital audio output providing remote digital audio signals and a digital video output providing remote digital video signals;
a video decoder connected which receives said remote digital audio signals and said remote digital video signals and in response thereto emitting remote analog video signals and remote analog audio signals;
a mixer which receives said remote analog video signals from said video decoder and said local analog video signals from said first video camera and emitting combined analog video signals in response thereto; and
a video grabber which receives said combined analog video signals, said remote audio signals, and said local audio signals and outputs digital signals in response thereto into EEG equipment, the digital signals to be temporally correlated with recorded EEG data; and
an enclosure containing the video decoder, the mixer, and the video grabber.

2. The device for enabling multi-camera video and audio recording for synchronization with long term ambulatory electroencephalography (EEG) in the home, office, or hospital environment of claim 1, wherein the device for video EEG uses the resident home power lines for networking said first and second cameras, and further comprises:
a first power line adapter and a second power line adapter, said first power line adapter connected to an electrical outlet in the local space and said second power line adapter connected to another electrical outlet in the remote space, said second power line adapter connected to the second video camera, wherein said remote digital audio signals and said remote digital video signals from said digital audio output and said digital video output are transmitted from said second power line adapter to said first power line adapter via a network connecting the first and second power line adapters.

3. The device for enabling multi-camera video and audio recording for synchronization with long term ambulatory electroencephalography (EEG) in the home, office, or hospital environment of claim 1, wherein the device mixes both local and remote audio and video signals for use by an EEG recording instrument.

4. The device for enabling multi-camera video and audio recording for synchronization with long term ambulatory electroencephalography (EEG) in the home, office, or hospital environment of claim 1, wherein the enclosure is completely custom for ease of use by technologists.

5. The device for enabling multi-camera video and audio recording for synchronization with long term ambulatory electroencephalography (EEG) in the home, office, or hospital environment of claim 1, wherein all functional parts including at least the video decoder, the mixer, and the video grabber are housed within the enclosure.

6. The device for enabling multi-camera video and audio recording for synchronization with long term ambulatory electroencephalography (EEG) in the home, office, or hospital environment of claim 1, wherein the enclosure includes a USB powered cooling capacity.

7. The device for enabling multi-camera video and audio recording for synchronization with long term ambulatory electroencephalography (EEG) in the home, office, or hospital environment of claim 1, wherein the device mixes the analog video and audio signals from the first camera and the analog video and audio signals from the video decoder and outputs the mixed audio and video signals into a digital format.

8. An apparatus for simultaneously recording video and audio in a local space and a remote space for synchronization with a long term ambulatory electroencephalography (EEG), the apparatus comprising:
- a first video camera which records local audio and local video in the local space when a subject is disposed in the local space, said first video camera having an analog audio output and an analog video output providing local analog audio signals and local analog video signals, respectively;
- a second video camera which records remote audio and video in the remote space when the subject is disposed in the remote space, said second video camera having a digital audio output providing remote digital audio signals and a digital video output providing remote digital video signals;
- a first power line adapter and a second power line adapter, said first power line adapter connected to an electrical outlet in the local space and said second power line adapter connected to another electrical outlet in the remote space, said second power line adapter connected to the second video camera, wherein said remote digital audio signals and said remote digital video signals from said digital audio output and said digital video output are transmitted from said second power line adapter to said first power line adapter via power lines that are connecting the two outlets to which the first and second power line adapters are connected;
- a video decoder connected to said first power line adapter, such that said remote digital audio signals and said remote digital video signals and in response thereto remote analog video signals and remote analog audio signals are output from said video decoder;
- a mixer which receives said remote analog video signals from said video decoder and said local analog video signals from said first video camera and emitting combined analog video signals in response thereto; and
- a video grabber which receives said combined analog video signals, said remote audio signals, and said local audio signals and outputs digital signals in response thereto into EEG equipment, the digital signals to be temporally correlated with recorded EEG data; and
- an enclosure containing the video decoder, the mixer, and the video grabber.

\* \* \* \* \*